United States Patent [19]

Rice et al.

[11] Patent Number: 5,393,967
[45] Date of Patent: Feb. 28, 1995

[54] METHOD AND APPARATUS FOR NON-CONTACT READING OF A RELIEF PATTERN

[75] Inventors: David A. Rice, Syracuse, N.Y.; Jacobus M. Oschmann, Tucson, Ariz.; Edward M. Valovage, Memphis; Marc J. Viggiano, Manlius, both of N.Y.

[73] Assignee: Sensis Corporation, Dewitt, N.Y.

[21] Appl. No.: 95,727

[22] Filed: Jul. 21, 1993

[51] Int. Cl.$^6$ .............................. G06K 7/10
[52] U.S. Cl. ..................... 235/454; 235/462; 235/494; 235/467; 235/440
[58] Field of Search ............... 235/462, 454, 494, 467, 235/472, 470, 490, 439, 440; 250/227.29, 206.1, 206.2

[56] References Cited

U.S. PATENT DOCUMENTS

| | | | |
|---|---|---|---|
| 4,282,425 | 8/1981 | Chadima, Jr. et al. | 235/462 X |
| 5,059,776 | 10/1991 | Antes | 235/462 X |
| 5,258,605 | 11/1993 | Metlitsky et al. | 235/455 X |

FOREIGN PATENT DOCUMENTS

| | | | |
|---|---|---|---|
| 0165180 | 9/1984 | Japan | 235/462 X |
| 0255083 | 10/1989 | Japan | 235/494 X |
| 4034682 | 2/1992 | Japan | 235/494 X |
| 4058380 | 2/1992 | Japan | 235/462 X |
| 0167252 | 6/1981 | Netherlands | 235/462 X |

Primary Examiner—Donald Hajec
Assistant Examiner—Esther H. Chin
Attorney, Agent, or Firm—Harris Beach & Wilcox

[57] ABSTRACT

There is disclosed a non-contact apparatus and method for reading a surface that has information encoded in a relief pattern thereon. The apparatus comprises an optical transmitter for projecting a line of light onto the relief pattern at a first angle to a normal of the surface; an optical receiver that views the projected line of light at a second angle to the normal of the surface and produces a signal that is representative of an image of the reflection thereon. The image viewed by the receiver has parallactic displacements of the line of illumination that occur transitions between raised and recessed portions of the relief pattern. The displacements are detected by a pattern detector which is coupled to the optical receiver and submitted to a decoder. The optical receiver can be realized as a plurality of light sensors arranged in a linear, or a two dimensional array, together with suitable focusing optics. The optical transmitter can produce either a fan beam of light or sweep a spot of light across the surface.

15 Claims, 7 Drawing Sheets

METHOD AND APPARATUS FOR NON-CONTACT READING OF A RELIEF PATTERN

BACKGROUND OF THE INVENTION

1. Field of the Invention

This invention relates in general to pattern recognition and in particular to a method and a system for noncontact reading of product or part identification patterns, and more specifically to reading of patterns which are present in relief form.

2. Description of the Prior Art.

The use of bar codes for identification of parts and products is widespread. The most common means of including a bar code for an object is to either affix a printed label, or to print-the code directly on the part or product. Most conventional bar code scanners require very high contrast between the bars and the background in order to properly read the code. In some cases, however, affixing a label or painting a code is either impractical or too expensive. For example, some surfaces will not allow labels to adhere properly or the presence of a label may interfere with the proper operation of the part.

One way to overcome the limitations of bar code labels and painted bar codes is to have the code set in relief on the surface of the object. This can be done by stamping, engraving, etching, milling, molding, or by other methods. The codes can be raised from the surface or can be depressed from the surface. The primary problem with such relief bar codes is that they cannot be read by currently available non-contact scanning techniques, since the contrast between the high and low parts of the pattern is generally very low.

SUMMARY OF THE INVENTION

It is therefore a primary object of the present invention to provide an improved method and apparatus for effectively reading and decoding relief patterns using non-contact techniques.

These and other objects of the present invention are attained by a non-contact apparatus for reading a surface that has information encoded in a relief pattern thereon, the relief pattern having relatively raised and recessed portions. The apparatus comprises an optical transmitter for projecting a line of light onto the relief pattern at a first angle to a normal of the surface; an optical receiver that views the projected line of light at a second angle to the normal of the surface and produces a signal that is representative of an image of the reflection thereon. The image incorporates apparent displacements of the line of illumination that occur at transitions between raised and recessed portions of the relief pattern therealong. The displacements are detected by a pattern detector which is coupled to the optical receiver. The output of the pattern detector is submitted to a decoder for converting a pattern of detected apparent or parallactic displacements into electrical signals which represent the decoded information contained in the relief pattern.

In accordance with one aspect of the invention the optical receiver and the optical transmitter are spaced apart in a plane that is substantially parallel to the surface.

In accordance with another aspect of the invention the decoder and pattern detector are realized by a digitizer and a microprocessor having a suitable program stored therein.

The optical receiver can be realized as a plurality of light sensors arranged in a two dimensional array, each having an output responsive to light energy incident thereon, and including optical means for projecting a focused image of the reflection on the sensors.

Alternatively the light sensors can be arranged in a linear array and the optical transmitter configured to sweep a spot of light across the relief pattern to define a substantially rectangular area thereon, a cross sectional dimension of the spot being less than the width of the smallest feature in the relief pattern in order to achieve a desired resolution. Apparent displacements of the line of illumination on the surface are represented by displacements of the focused image along the linear array.

BRIEF DESCRIPTION OF THE DRAWING

For a better understanding of these and other objects of the present invention, reference is made to the detailed description of the invention which is to be read in conjunction with the following drawings, wherein:

FIG. 5a is an enlarged fragmentary perspective view of FIG. 5 taken on line 5a–5a;

DESCRIPTION OF THE PREFERRED EMBODIMENT

Figure 1:
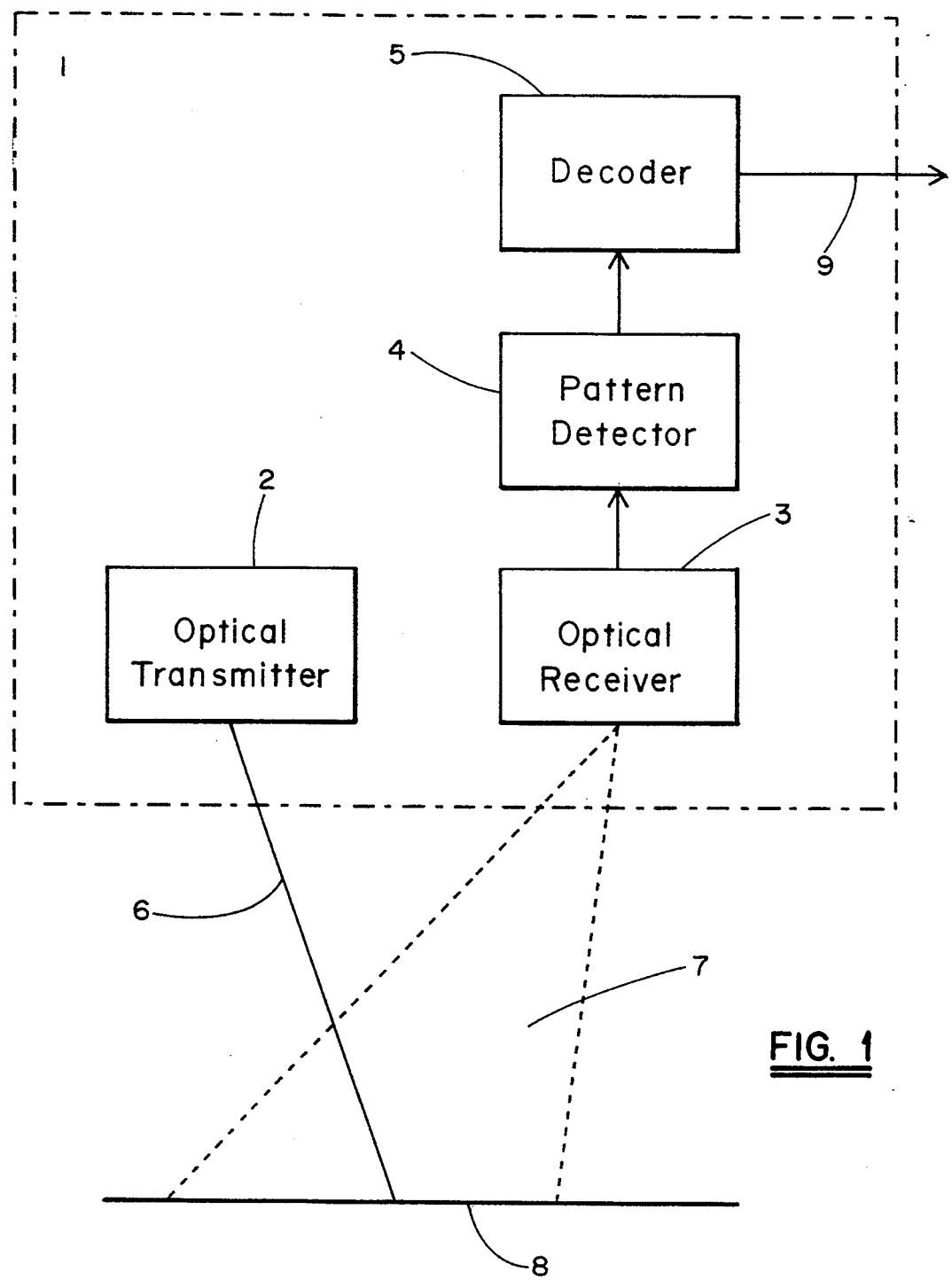
FIG. 1 illustrates a block diagram of a relief pattern reading apparatus in accordance with the invention.

With reference now to the Drawing and in particular to FIG. 1, there is depicted a representation of a relief pattern reading apparatus 1, in accordance with a preferred embodiment of the invention, positioned near an object surface containing a relief pattern 8. The relief pattern reading apparatus 1 includes an optical transmitter 2, an optical receiver 3, a pattern detector 4, and a decoder 5. A preferred embodiment of the present invention may be implemented with the components 2, 3, 4, 5 in a single unit, or with any or all of the components 2, 3, 4, 5 in separate enclosures.

The optical transmitter 2 emits a beam of light 6 which impinges on the object surface containing the relief pattern 8. The beam of light 6 emitted from the optical transmitter 2 can be either a spot beam which is swept or scanned, or the beam of light 6 may be a stationary beam. In either case, the beam, if projected onto a flat surface, would appear as a line of light. Alternate methods of illuminating the surface are shown respectively in FIGS. 2 and 3, wherein the light beams are diagrammatically shown as originating from a source in the optical transmitter 2, the structural details of which have been omitted for clarity.

Figure 2:
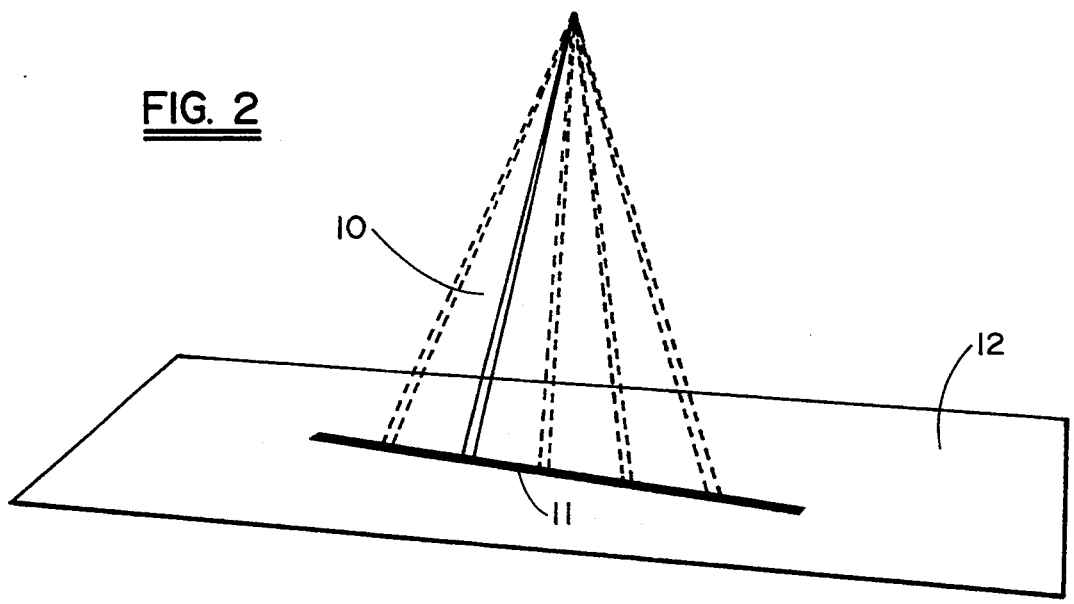
FIG. 2 illustrates a swept column beam of light impinging on a flat surface.

In FIG. 2 there is depicted a spot beam of light 10, which is swept or scanned to form a line 11 when projected onto a flat surface 12. Representative positions of the beam 10 as the spot moves across the surface are indicated by the series of dotted lines in FIG. 2.

Figure 3:
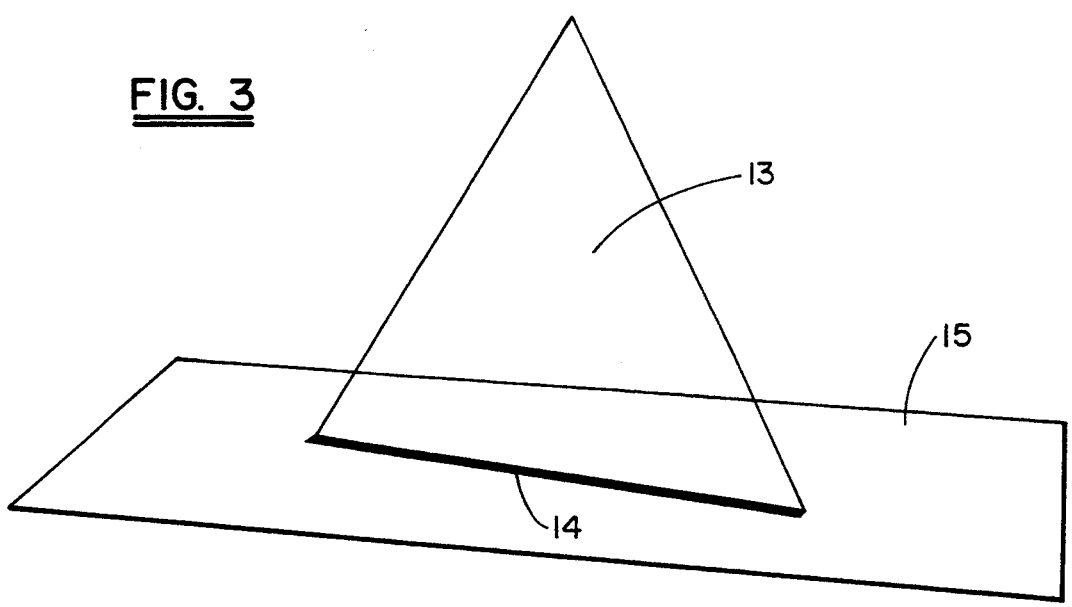
FIG. 3 illustrates a fan beam of light impinging on a flat surface.

Referring to FIG. 3, there is depicted a fan beam of light 13, which forms a line 14 when projected onto the flat surface 15.

Turning again to FIG. 1, the optical receiver 3 is positioned such that its field of view 7 contains the projected image of the line of illumination produced by the beam of light 6 on the surface 8. The optical receiver 3 converts the image in its field of view 7 into electrical signals which can be processed by the pattern detector 4. The pattern detector 4 extracts the coded pattern from the electrical representation of the image and sends the coded pattern to the decoder 5 for decoding. This representation may be a digitized signal as is known to the decoding art, or could be in other well known formats. The decoder 5 decodes the coded pattern to extract the character string or other information which was encoded into the relief pattern. The decoder 5 uses techniques well known in the art to decode the coded pattern, and as such is not a subject of the present invention. The decoder 5 outputs the decoded character string or information to a display or similar conventional device using a communications port 9. This communications port 9 may take many forms and is also not a subject of the present invention.

Figure 4:
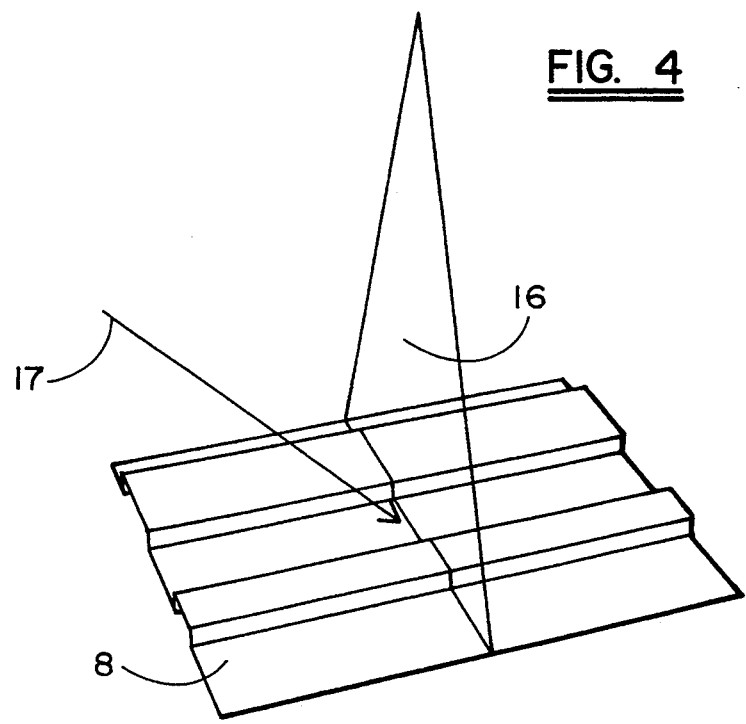
FIG. 4 illustrates a swept column or fan of illumination impinging on a relief patterned surface.

In order for the components in FIG. 1 to be utilized in reading relief patterns, the optical transmitter 2 must be separated from the optical receiver 3 by some distance. Referring to FIG. 4, the swept spot or fan illumination 16 generated by the optical transmitter 2 impinges upon the relief pattern 8 forming what appears from the viewpoint of the optical transmitter 2 to be a straight line. The optical receiver 3 is positioned such that its direction of view 17 is as shown in FIG. 4.

Figure 5:
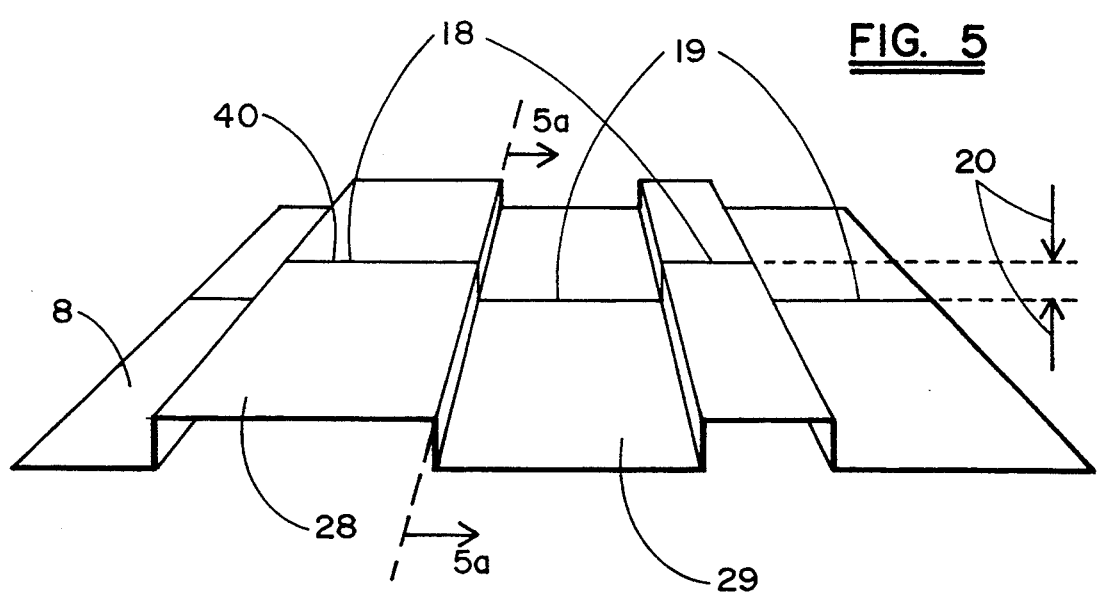
FIG. 5 is an enlarged perspective view of a surface bearing a relief pattern which has been exaggerated for clarity to illustrate parallactic displacements of a line of illumination.

FIG. 5 depicts the image of the relief pattern surface 8 as seen from the point of view of the optical receiver 3. Because of the separation of the optical transmitter 2 and the optical receiver 3, those portions of the illuminated surface 18 which are on the raised portions of the pattern exhibit a parallactic displacement 20 from those portions of the illuminated surface 19 on the lower portions of the pattern. It is this parallactic displacement 20 which is detected by the pattern detector 4.

Figure 5A:
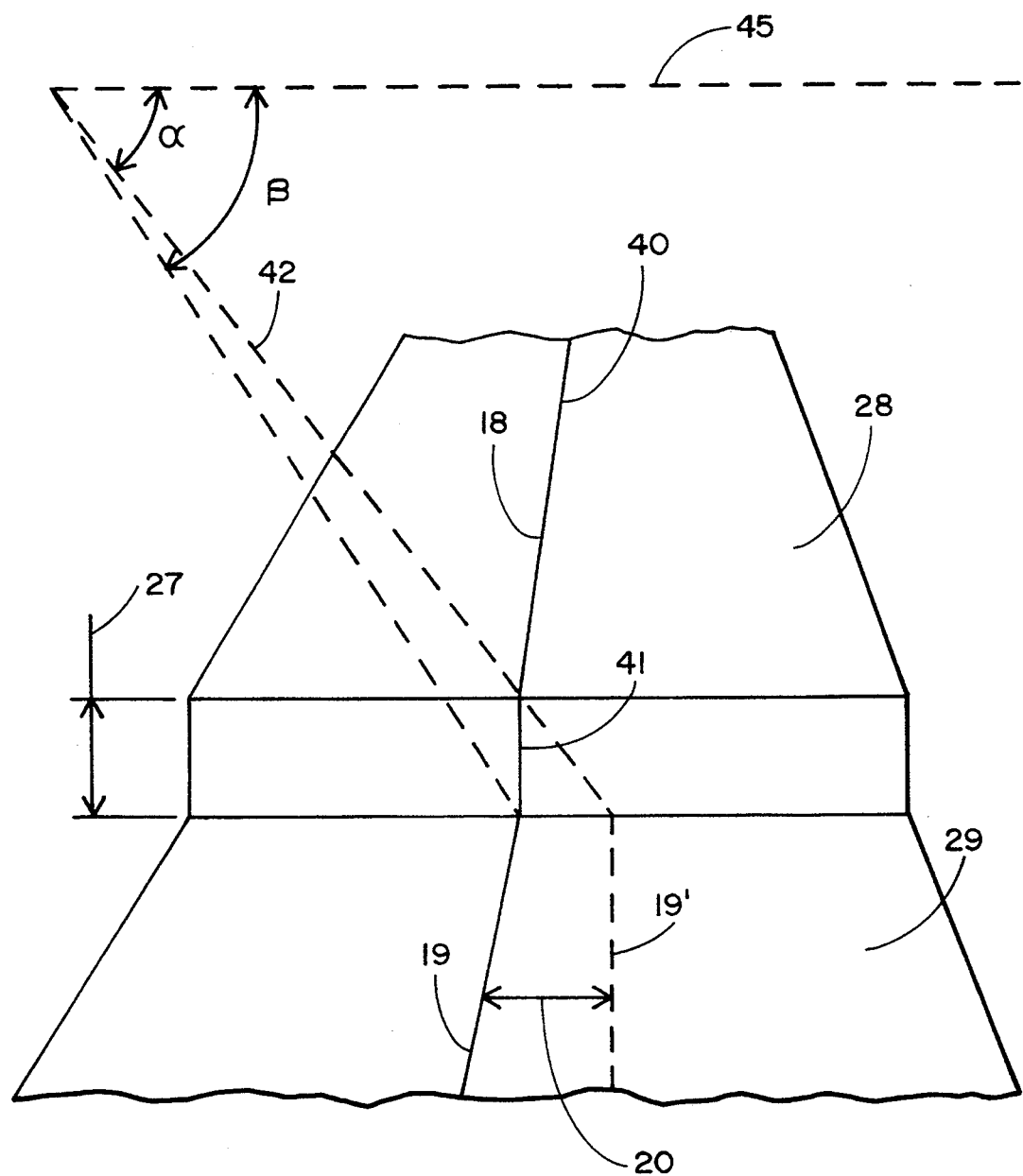

In order to better understand the apparent displacement of the line of illumination along the relief pattern it will be helpful to refer to FIG. 5a, in which a line of illumination, indicated generally by reference numeral 40, has a segment 18 that crosses a relatively raised zone 28 of the relief pattern, and a substantially vertical segment 41, representing a transition between raised portion 28 and relatively recessed zone 29. Line 40 continues horizontally along zone 29 as segment 19. An angularly displaced observer, such as optical receiver 3 in FIG. 1, views the relief pattern along line 42. Such an observer would perceive segment 18, and segment 19' (shown as a dotted line in FIG. 5a) as collinear, as the angular displacement $\alpha$ of these segments from the observer's optical axis 45 is identical. Dotted line 19' of course is not actually part of the line of illumination. This observer perceives segment 19, the actual line of illumination, as being displaced a distance 20 from segment 18, a phenomenon referred to herein as parallactic displacement. It will be evident that the degree of parallactic displacement is a function of the difference between the angular displacement $\beta$ of segment 19 and the angular displacement $\alpha$ of segment 18. This angular difference is affected by the distance between the relief pattern and the observer and of the dimension 27 that represents the relative difference in elevation of portions 28 and 29.

While the above explanation assumes a substantially vertical illuminating beam and an angularly displaced observer, the optical transmitter and receiver can be exchanged. An angular displacement of approximately equal magnitude but of opposite direction will result. Neither component need be vertical.

Figure 6:
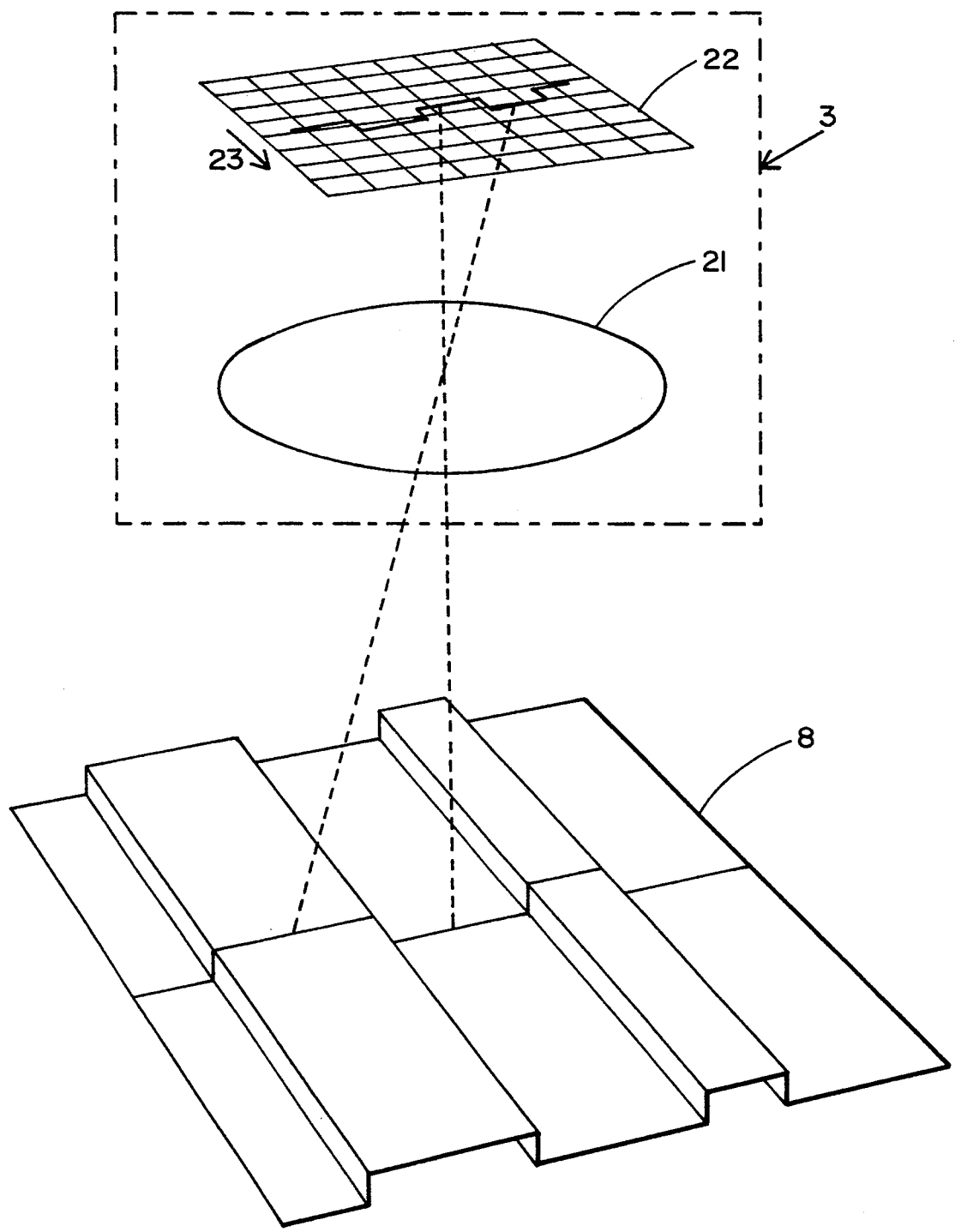
FIG. 6 is a diagram that illustrates a mapping of an image of the line of illumination on the surface shown in FIG. 5 onto a two-dimensional photodetector array in an optical receiver.

The optical receiver 3 can be constructed using either a linear array of photodetectors or a square or rectangular two-dimensional array of photodetectors. Any conventional photodetector array such as a CCD array is suitable. Referring now to FIG. 6, optical receiver 3, schematically enclosed by the dashed line in FIG. 6, comprises imaging lens 21 and two-dimensional array of photodetectors 22. Imaging lens 21 collects light from the illuminated portions of surface 8, and focuses the light to form an image on two-dimensional array of photodetectors 22. The parallactic displacement 20 is translated by imaging lens 21 into a displacement in the direction arrow 23 on the two-dimensional array of photodetectors 22. This image containing the displacement is translated by two-dimensional array of photodetectors 22 into an electrical representation of the image which is sent to the pattern detector for further processing. This optical receiver configuration can use either a swept spot beam or a fixed fan beam implementation of the optical transmitter 2.

Figure 7:
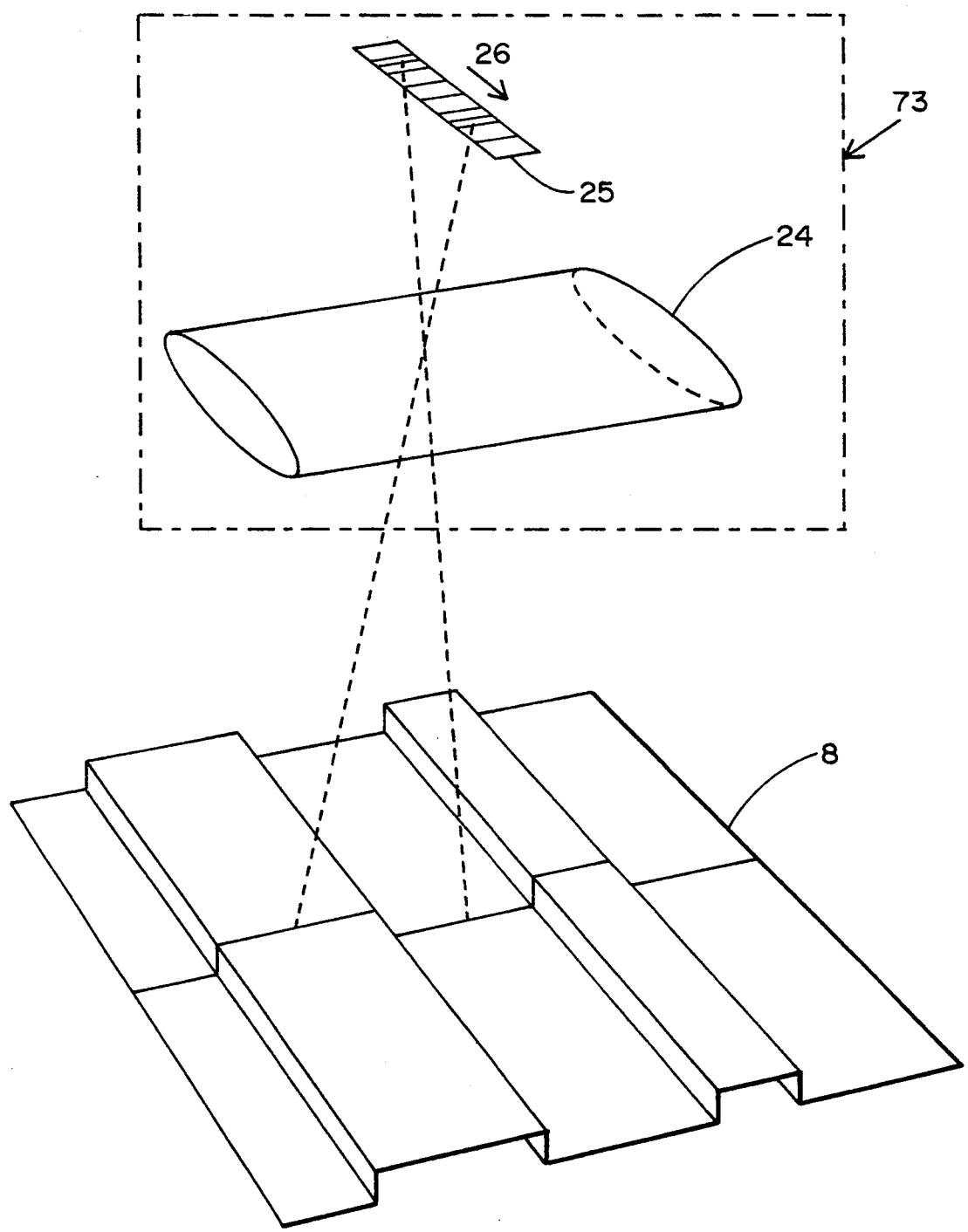
FIG. 7 diagrammatically illustrates a mapping of an image of a line of illumination generated by sweeping a beam of light across the surface shown in FIG. 5 onto a linear photodetector array.

FIG. 7 depicts an alternative embodiment of the optical receiver in accordance with the invention. In this preferred embodiment, optical receiver 73 comprises a lens system 24, which can be a cylindrical lens, and a linear array of photodetectors 25. This embodiment requires the use of the swept spot beam implementation of the optical transmitter 2. The lens system 24 focuses light from the relief surface onto the linear array 25 such that each element or cell of the linear array 25 collects light from an area of the surface that is approximately parallel to the direction of the illuminating beam's image. The parallactic displacement 20 is therefore translated by the lens system 24 into a displacement on the linear array of photodetectors 25 in the direction of arrow 26. At any point along the sweep of the spot beam, the photodetector cell with the highest intensity corresponds to the position of the surface that the spot beam is incident upon. The optical receiver 73 generates an electrical representation of the current position of the spot which, when sampled over the entire sweep of the spot, directly indicates the relative height of the relief at each sample point. This information is sent to the pattern detector 4 for further processing.

Decoder 5 and pattern detector 4 are known in the art, and as they form no part of the present invention, they will not be further discussed herein.

Figure 8:
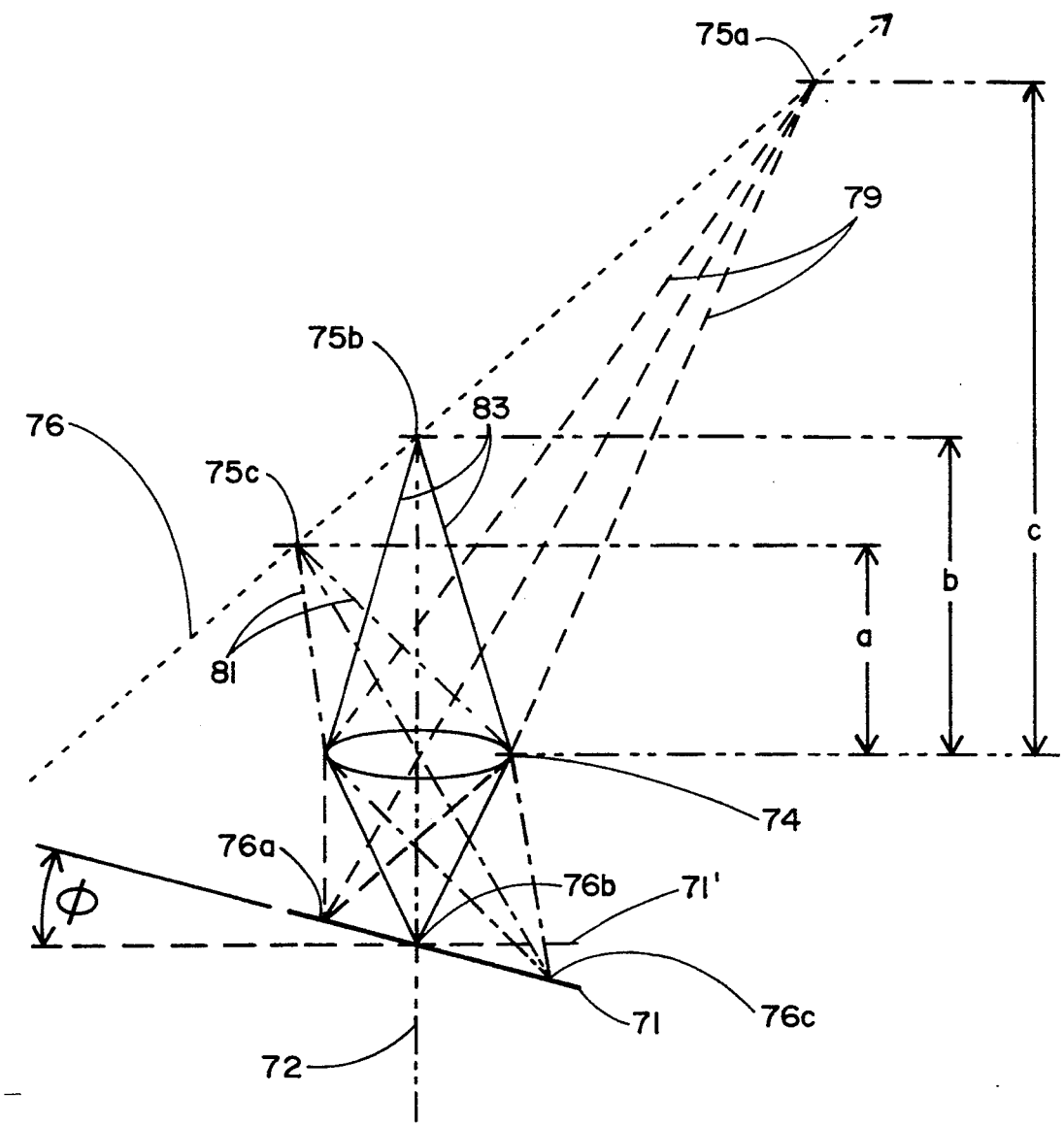
FIG. 8 schematically illustrates an alternate optical arrangement for mapping the image onto the photodetector array of FIGS. 6 and 7.

In FIG. 8 there is shown an alternate embodiment of the arrangement of FIGS. 6 and 7. A lens system, shown as lens 74 has an optical axis 72. The lens system can be a single element, or can be a combination as is appropriate for a given application. An image plane 71' is defined which is substantially normal to the optical axis 72. Individual surfaces being scanned by the system have a bar coded symbol thereon, possible locations of which are indicated by lines 75a–75c. The remainder of the surfaces on which the bar code symbols are located have been omitted for clarity. It is understood that while three bar code symbol locations from three different surfaces are illustrated, only one surface is scanned at any one time. The bar code symbol may be the same symbol as shown in FIGS. 6 and 7. A fan beam of light, indicated in two dimensional projection by dotted line 76, is projected, preferably by a laser, striking the surface and the bar code symbols. In general the bar code symbols being scanned will not lie on the optical axis 72, so that light rays striking points 75a–75c do not travel equal distances from the light source. Reflected light from the scanned surfaces is collected by lens 74, the principal rays being indicated by the dotted lines 79, 79, 81, 81 and solid lines 83, 83, and then projected generally towards a photodetector array 71 which can be linear or two-dimensional. In general, due to the variation in the positions of individual surfaces being scanned, light paths extending to the image plane 71' from points on the surfaces that lie at a constant half angle with respect to optical axis 72 vary in length. Another consequence of the positional variation in the scanned surfaces is that the planes normal to axis 72 and passing through various bar code elements being scanned, indicated as points 75a–75c, lie at different distances (shown as dimensions "a", "b" and "c" respectively) from the lens 74. Consequently the image plane 71' does not include all the images 76a, 76b and 76c of points 75a, 75b, and 75c respectively, but can include at most only one of them, here shown as point 76b. The photodetector array 71 is tilted from the normal of optical axis 72 at a tilt angle $\Psi$, so that points 76a–76c all fall approximately on the array 71. The angle $\Psi$ is readily calculated to minimize the distances of points such as 76a–76c from the actual position of array 71 using the equations of lens 74, or it may be determined empirically. Although shown for clarity as a single dotted line 76, the laser light is actually a fan beam, and the three dimensional surfaces that include points 75a–75c have been omitted for clarity. Tilting the array 71 with respect to the image plane 71' substantially increases the functional depth of field of the system. It will be apparent that points on other three dimensional surfaces (not shown) that lie intermediate points 75a and 75c will be focused on a pixel element somewhere on array 71.

While this invention has been explained with reference to the structure disclosed herein, it is not confined to the details set forth and this application is intended to cover any modifications and changes as may come within the scope of the following claims:

1. An non-contact apparatus for reading a surface that has information encoded in a relief pattern thereon, the relief pattern having relatively raised and recessed portions and transitions therebetween, the recessed portions having bottom surfaces and aligned in a lengthwise direction, comprising:

optical transmitter means for projecting a line of light onto the bottom surfaces of the recessed portions of the relief pattern at a first angle to a normal of the surface;

optical receiver means viewing said projected line of light on the relief pattern at a second angle to the normal of the surface for producing a signal that is representative of an image of a reflection whereby said image includes a parallactic displacement of said projected line at a transition between a raised portion and the bottom surface of a recessed portion of the relief pattern therealong; and means coupled to said optical receiver means for detecting a characteristic of said signal that indicates a parallactic displacement in said image, and having an output responsive to said parallactic displacement;

whereby said output of said means for detecting is responsive to the transitions in the relief pattern.

2. The apparatus of claim 1, further comprising decoder means, coupled to said means for detecting, for converting a pattern of detected parallactic displacements into electrical signals which represent decoded information contained in the relief pattern.

3. The apparatus of claim 2, wherein said decoder means comprises a digitizer and a microprocessor.

4. The apparatus of claim 1, wherein said optical receiver means comprises:

a plurality of light sensors arranged in a two dimensional array, each having an output responsive to light energy incident thereon; and optical means for projecting a focused image of said reflection on said sensors.

5. The apparatus of claim 4, wherein said optical receiver means has an optical axis, and said array is disposed at a tilt angle $\Psi$ with respect to a plane that is normal to said optical axis.

6. The apparatus of claim 1, wherein said optical transmitter means produces a fan beam of light that illuminates an elongated substantially rectangular area on the surface.

7. The apparatus of claim 1, wherein relief pattern has differences in height between the raised and recessed portions, and said optical transmitter means sweeps a spot of light across the relief pattern to define a substantially rectangular area thereon that includes said parallactic displacement.

8. The apparatus of claim 7, wherein said optical receiver means comprises:

a plurality of light sensors arranged in a linear array, each having an output responsive to light energy incident thereon; and optical means for projecting a focused image of said rectangular area on said linear array, said image being aligned such that said parallactic displacement corresponds to a along said linear array;

whereby parallactic displacements on the surface are detected as said spot sweeps across the relief pattern.

9. The apparatus of claim 8, wherein said optical receiver means has an optical axis, and said linear array is disposed at a tilt angle $\Psi$ with respect to a plane that is normal to said optical axis.

10. The apparatus of claim 1, wherein said optical transmitter means projects said line of light in substantial alignment with said lengthwise direction of said recessed portions.

11. A method for reading a surface that has information encoded in a relief pattern thereon, the relief pattern having relatively raised and recessed portions and transitions therebetween, the recessed portions having bottom surfaces and aligned in a lengthwise direction, comprising the steps of:

projecting a beam of light onto the raised portions of the relief pattern and onto the bottom surfaces of the recessed portions of the relief pattern at a first angle to a normal of the surface;

detecting a reflection of said projected line of light from the surface at a Second angle to the normal of the surface, and producing a first signal that is representative of an optical pattern of said reflection; and detecting a transition in said optical pattern that represents a parallactic displacement between a raised portion and the bottom surface of a recessed portion of the relief pattern; whereby said second signal is representative of the transitions in the relief pattern.

12. The method of claim 11, further comprising the step of decoding said second signal.

13. The method of claim 11, wherein said step of projecting is performed by sweeping a spot of light across the surface.

14. The method of claim 11, wherein said step of projecting is performed by focusing a fan beam of light on the surface to produce a line of illumination thereon.

15. The method of claim 11, wherein said step of projecting is performed by projecting said line of light in substantial alignment with said lengthwise direction of said recessed portions.

* * * * *